US012712964B2

(12) United States Patent
Hunsaker et al.

(10) Patent No.: US 12,712,964 B2
(45) Date of Patent: Aug. 18, 2026

(54) SMART PHONE NETWORK FOR HEARING IMPAIRED

(71) Applicant: T-Mobile Innovations LLC, Overland Park, KS (US)

(72) Inventors: Melinda Hunsaker, Kent, WA (US); Misty Dombrowski, Renton, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 485 days.

(21) Appl. No.: 18/322,683

(22) Filed: May 24, 2023

(65) Prior Publication Data

US 2024/0396991 A1 Nov. 28, 2024

(51) Int. Cl.

*H04M 1/72478* (2021.01)
*G10L 15/26* (2006.01)
*H04M 1/60* (2006.01)
*H04M 1/72412* (2021.01)
*H04R 1/02* (2006.01)
*H04R 3/00* (2006.01)
*H04R 19/02* (2006.01)

(52) U.S. Cl.

CPC ......... *H04M 1/72478* (2021.01); *G10L 15/26* (2013.01); *H04M 1/6066* (2013.01); *H04M 1/72412* (2021.01); *H04R 1/028* (2013.01); *H04R 3/00* (2013.01); *H04R 19/02* (2013.01); *H04R 2201/003* (2013.01); *H04R 2420/07* (2013.01); *H04R 2499/11* (2013.01)

(58) Field of Classification Search

CPC ........... H04M 1/72478; H04M 1/6066; H04M 1/72412; G10L 15/26; H04R 1/028; H04R 3/00; H04R 19/02; H04R 2201/003; H04R 2420/07; H04R 2499/11; H04R 25/04; H04R 25/554; H04R 27/02

See application file for complete search history.

(56) References Cited

U.S. PATENT DOCUMENTS

| | | | | |
|---|---|---|---|---|
| 10,757,512 | B2 | 8/2020 | Schnell et al. | |
| 2005/0135644 | A1 | 6/2005 | Qi | |
| 2011/0188687 | A1 * | 8/2011 | Song | H04R 25/00 381/321 |
| 2015/0326984 | A1 * | 11/2015 | Haubrich | H04R 25/554 381/315 |
| 2019/0281394 | A9 * | 9/2019 | Ungstrup | H04R 25/30 |
| 2020/0007671 | A1 * | 1/2020 | Engelke | H04M 3/42391 |
| 2020/0128317 | A1 * | 4/2020 | Feldman | H04R 1/083 |

* cited by examiner

*Primary Examiner* — Farid Seyedvosoghi
(74) *Attorney, Agent, or Firm* — Jones Burke PLLC

(57) ABSTRACT

Systems and methods are provided for outputting audible sound processed with a hearing loss compensation algorithm for listening by a user of user smart phone. A method includes receiving live digital micro electrical-mechanical system (MEMs) sound data from a speaker phone. The method further includes processing, at a subscribed user smart phone, the live digital MEMS sound data from the speaker smart phone in accordance with a hearing loss compensation algorithm. The subscribed user smart phone generates and outputs audible sound waves for the live digital for listening by the user of the subscribed user smart phone.

20 Claims, 6 Drawing Sheets

100

105
110
130
155
140
115
160
165
145
150
125
120

SMART PHONE NETWORK FOR HEARING IMPAIRED

TECHNICAL BACKGROUND

Over 450 million people worldwide have disabling hearing loss. Over 50% of those over 75 years old experience hearing loss. Traditionally, hearing aids make sound louder, including background noise. As there is an increase in the number of people experiencing hearing loss, so is the need to provide solutions to aid the hearing impaired.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operations. In the drawings.

OVERVIEW

Figure 1:
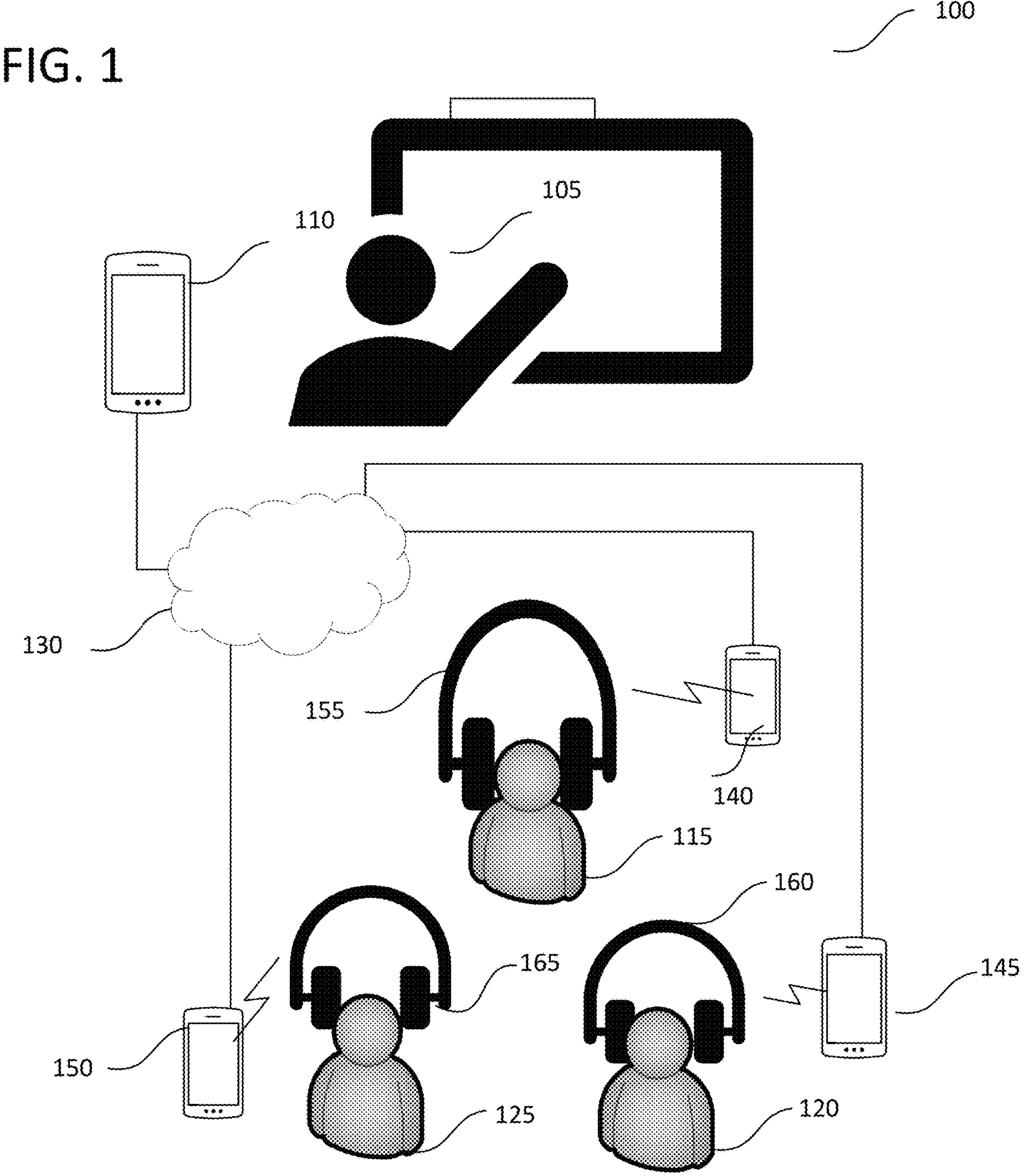
FIG. 1 depicts a smart phone network for hearing impaired users, in accordance with disclosed embodiments.

Various aspects of the present disclosure relate to systems, methods and computer readable media for processing live sound data from a speaker's smart phone with a hearing loss algorithm to generate and output audible sound waves at a user's smart phone.

In embodiments, a system, method and computer readable medium include receiving at a user's smart phone live digital micro electrical-mechanical system (MEMs) sound data from a MEMs microphone of a speaker's smart phone. The user's smart phone processes the live digital MEMs sound data from the speaker smart phone in accordance with a hearing loss compensation algorithm. The user's smart phone generates audible sound waves for the live digital MEMS sound data processed utilizing the hearing loss compensation algorithm. The audible sound waves generated are output for listening by the user of the user smart phone.

In other embodiments, the user smart phone has subscribed to receive live digital MEMs sound data from the speaker smart phone. In embodiments, the user smart phone is one of a plurality of user smart phones that has subscribed to receive live digital MEMs sound data from the speaker smart phone. In embodiments, the speaker smart phone may be a smart phone positioned near a live speaker.

In additional embodiments, the live digital MEMs sound data is live streamed from the speaker smart phone to the user smart phone. In another example, the live digital MEMs sound data is live streamed via wi-fi from the speaker smart phone to the user smart phone.

In other embodiments, a speech to text algorithm generates subtitles for the live digital MEMS file. The generated subtitles are output for viewing by a user of the user smart phone.

In another example, a system, method and computer readable medium registers a plurality of user smart phones as subscribers for live sound from a speaker smart phone. The speaker smart phone captures live sound using a digital electrical-mechanical system (MEMs) microphone. The captured live sound is converted to digital sound data. The digital sound data is encoded for transmission to each of the registered user smart phones. The speaker smart phone transmits the encoded digital sound data to each of the registered smart phones.

In embodiments, the plurality of user smart phones and the speaker smart phone are co-located. The live digital sound data is live streamed as it is captured from the speaker smart phone to each of the plurality of subscribed user smart phones in near real-time.

In embodiments, the plurality of subscribed user smart phones are each co-located within 100 feet of the speaker smart phone. The speaker smart phone may be a smart phone positioned near a live speaker in an auditorium setting.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In addition to the particular systems and methods described herein, the operations described herein may be implemented as computer-readable instructions or methods, and a controller on the network for executing the instructions or methods. The controller may include an electronic processor included in a smart phone.

Over 450 million people worldwide have disabling hearing loss. Over 50% of those over 75 years old experience hearing loss. Traditionally, hearing aids make sound louder, including background noise. Current hearing loss applications, like Live Listen, increase intelligibility for hearing-impaired listeners.

These hearing loss applications are limited to use with a single smart phone, such as the smart phone of a hearing-impaired (HI) user. The smart phone of the HI user is placed near a live speaker, such as a teacher or presenter, to capture sound. The sound received via the HI user's smart phone microphone is processed by the HI user's smart phone for a HI user to listen using headphones, hearing aid or ear buds connected to the HI user's smart phone.

These hearing loss applications are limited to a single hearing-impaired (HI) user's smart phone. When using these hearing loss applications, the HI user's smart phone is out of the HI user's possession as the user may be seated far from the speaker in an auditorium setting. Additionally, the user cannot monitor the smart phone's battery and incoming calls may interfere with using the smart phone. Due to privacy concerns, the HI user may need to seek separate approval from the speaker or presenter to use the HI user's smart phone in such a manner.

To provide a safer, more convenient solution of using smart phones to aid HI smart phone users, examples disclosed herein provide systems and methods for using hearing loss compensation algorithms in a way that improves the HI user and speaker experience. A smart phone, such as the teacher or speaker's smart phone, is designated as a "speaker." The designated speaker's phone utilizes its microphone and live streams the sound from the microphone of the speaker's smart phone directly to the other meeting participants, such as HI listeners using hearing aids or headphones with their smart phones. Live sound is captured in real or near real-time by the speaker smart phone and is not pre-recorded sound.

This allows multiple listeners in a live meeting event, such as a classroom or auditorium, to stream and listen to live audio processed with a hearing loss compensation algorithm without using the microphones of HI user's smart phones. Thus, a HI smart phone user does not have to be separated from their smart phone or seek permission from a live speaker to use the microphone of HI user's smart phone to live stream audio.

Up to 85% of Americans use smart phones on a regular basis. Using a speaker smart phone to live stream audio to live meeting participants for processing with a hearing loss compensation algorithm obviates the need for large production and setup to communicate with the hearing impaired during live events such as live meetings and live conferences. Traditionally, these events require significant setup time, microphones, cameras and live streaming applications. The smart phone configuration minimizes the need for significant set up for live events and provides a seamless experience for the HI smart phone users and the live speaker.

In addition to processing live stream audio from a speaker's smart phone with hearing loss compensation algorithms on listeners' smart phones, a speech to text algorithm can be applied by a listener's smart phone to the live stream audio from the speaker's smart phone to provide speech to text on the listener's smart phone screen or audible outputs.

Turning now to the figures, various devices, systems, and methods in accordance with aspects of the present disclosure will be described.

FIG. 1 is a system 100 illustrating networked smart phones. System 100 includes a plurality of smart phones 110, 140, 145, and 150. A smart phone may be a cell phone, mobile phone, a wireless phone, as well as other types of devices or systems that can send and receive audio or data. System 100 may be located and/or associated with a live meeting setting such as an auditorium, classroom, or meeting venue. Smart phone 110 is a smart phone associated with a live speaker 105. Smart phone 110 captures sound in real-time using its microphone and transmits or live streams the sound via network 130 to smart phones 140, 145 and 150.

Smart phones 140, 145 and 150 are smart phones associated with live listeners 115 120 and 125. Live listeners may be HI users. Smart phones 140, 145 and 150 process the transmitted real-time audio received from smart phone 110 with a hearing loss compensation algorithm. Smart phones 140, 145 and 150 each generate audible sound waves for processed real-time audio received. Smartphones 140 and 145 and 150 output the generated audible sound waves adapted for listening by the user of the user's smart phone. In one example the generated audible sound waves are output to listening devices 155, 160 and 165 that are connected to smart phones 140, 145 and 150 respectively. Listening devices 155, 160 and 165 may be headphones, earbuds or hearing aids connected to smart phones 140, 145 and 150. Smart phones 140, 145 and 150 are connected to audible listening devices 155, 160, and 165 by a wireless connection such as Bluetooth.

The group of smart phones 110, 140, 145 and 150 are connected by network 130. The group of smart phones 110, 140, 145 and 150 may be connected by any desired type of networking technology using any desired communication protocol and in any desired network topology. For example, smart phones 110, 140, 145 and 150 may be connected via Wi-Fi network such as wireless local area networks, wireless metropolitan area networks, wireless personal area networks and wireless wide area networks.

Smart phones 110, 140, 145 and 150 have antennas that support Wi-Fi and cellular communication. The antennas may support cellular frequencies and dual band Wi-Fi including 2400-2484 MHz (which also includes Bluetooth) and 5150-5850 MHz.

Figure 2:
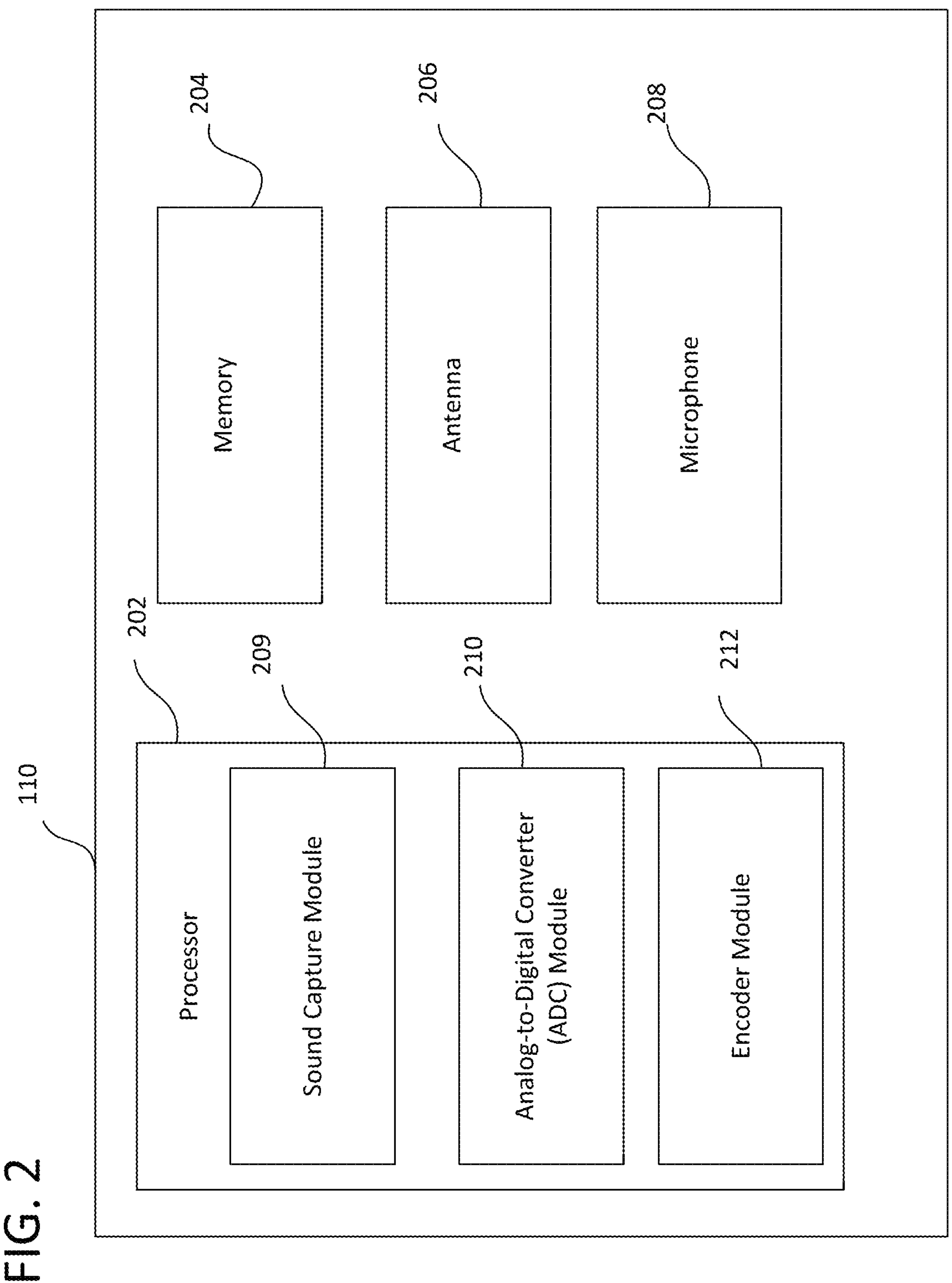
FIG. 2 depicts an exemplary speaker smart phone, in accordance with the disclosed embodiments.

FIG. 2 depicts an exemplary speaker smart phone 110. Smart phone 110 is associated with a live speaker 105. The smart phone 110 may include a processor 202 and memory 204 coupled to processor 202. In some examples, the processor 202 may be a central processing unit (CPU), a graphics processing unit (GPU), or both CPU and GPU, or other processor or processing unit or component known in the art. Memory 204 may include volatile memory (such as random-access memory (RAM)) and/or non-volatile memory (such as read-only memory (ROM), flash memory, etc.).

Smart phone 110 may include a radio frequency antenna 206 and a microphone 208. Antenna 206 may be a radio frequency (RF) antenna, coupled to processor 202. Antenna 206 transmits and receives RF signals. Microphone 208 receives sounds waves and converts sound waves into an analog signal. An exemplary microphone utilized with smart phone 110 is a micro electrical-mechanical system (MEMS) microphone that is etched into a silicon wafer or chip using MEMS technology. The mic signal from a MEMs microphone may be processed within the same chip by an ADC converter module 210. The MEMS microphone then outputs a strong digital mic signal for smart phone, such as smart phones 140, 145 and 150 to utilize.

Processor 202 comprises sound capture module 209, analog to digital converter (ADC) module 210 and encoder module 212. Sound capture module 209 captures the sound from microphone 208 and transfers it to ADC module 210.

The ADC module 210 converts the analog signal from microphone 208 into digital data. The digital data is encoded into bit streams by encoder module 212. The bit streams of digital data for transmission via antenna 206. The digital data is sent to smart phones 140, 145 and 150 for processing with a hearing loss compensation algorithm.

Figure 3:
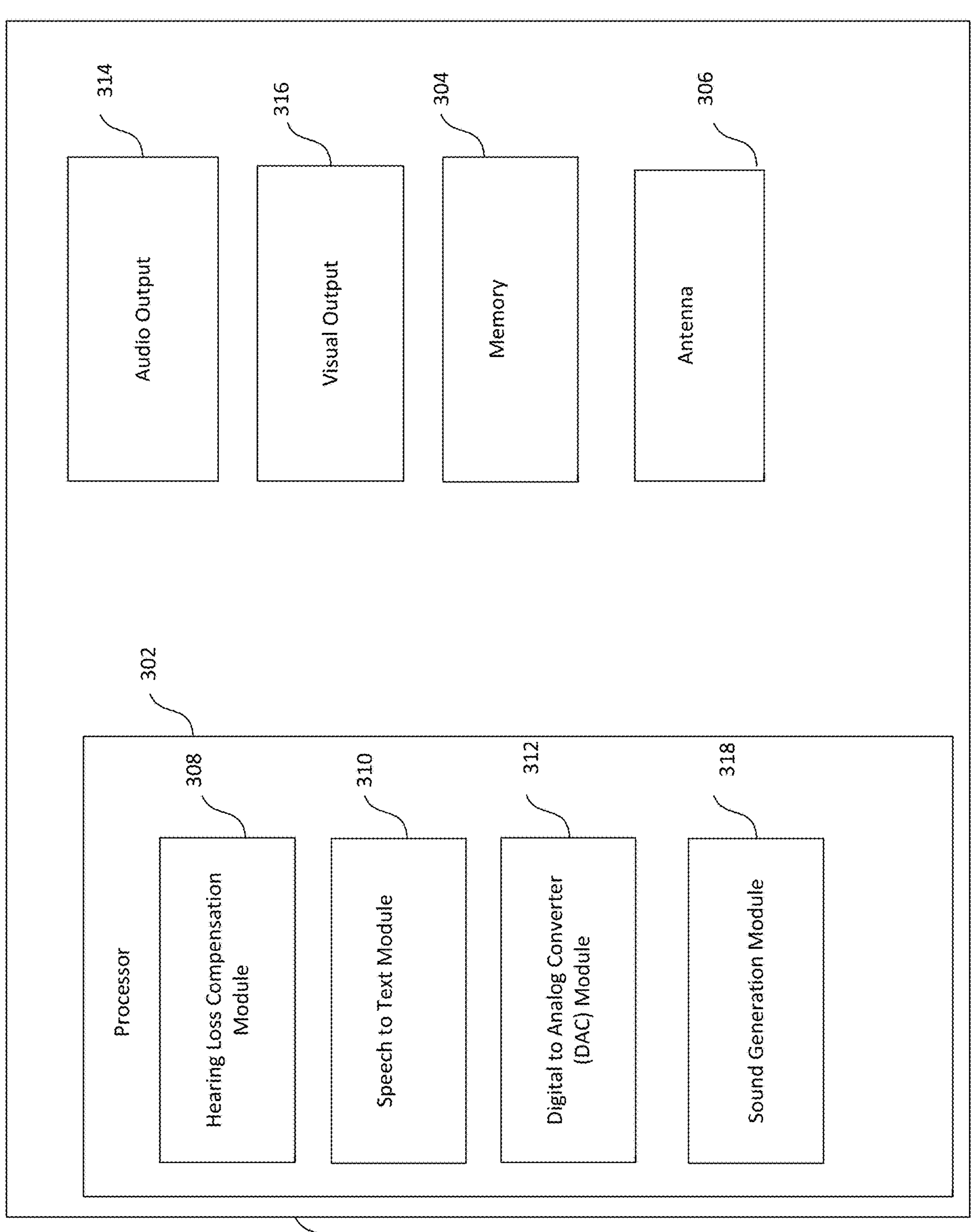
FIG. 3 depicts an exemplary user smart phone, in accordance with the disclosed embodiments.

FIG. 3 depicts an exemplary smart phone 140, such as smart phones 140, 145 and 150. The smart phone 140 may include one or more processors 302 and memory 304 coupled to the one or more processors 302. In some examples, the one or more processors 302 may be a central processing unit (CPU), a graphics processing unit (GPU), or both CPU and GPU, or other processing unit or component known in the art. Memory 304 may include volatile memory (such as random-access memory (RAM)) and/or non-volatile memory (such as read-only memory (ROM), flash memory, etc.).

Smart phone 140 may include a radio frequency antenna 306. Antenna 306 may be a radio frequency (RF) antenna, coupled to processor 202. Antenna 206 transmits and receives RF signals. For example, antenna 206 receives digital data from the MEMs microphone of smart phone 110.

Smart phones 140, 145 and 150 receive digital MEMs sound data from smart phone 110. Smart phones 140, 145 and 150 process the digital MEMS sound data using hearing loss compensation algorithm module 308. Exemplary hearing loss compensation include sound core processing algorithms, compression algorithms, amplification algorithms, machine learning algorithms, speech separation or noise reduction algorithms, talker dependent analysis and combinations of thereof.

In one example, a multi-channel wide dynamic range compression (WDRC) algorithm is utilized. The WDRC algorithm provides listeners with frequency-specific amplification based on measured changes in their sensitivity thresholds. Other exemplary hearing loss compensation algorithms including deep learning-based speech separation or noise reduction needs, Deep learning based speech separation or noise reduction needs to generalize to voices not encountered during training and to operate under multiple corruptions. A talker-independent deep computational auditory scene analysis (CASA) algorithm separate talkers and de-reverberates in each time frame.

Hearing loss compensation algorithms can be tailored to individuals based on hearing loss type such as sensorineural hearing loss, conductive hearing loss and mixed hearing loss. In one example, a HI user of smart phone 140 may choose the preferred hearing loss compensation algorithm to apply to the digital MEMs sound data. The preferred hearing loss compensation algorithm may be based on the HI user's previous experiences and/or type of hearing loss. The hearing loss compensation algorithm generates a processed digital signal converting the digital MEMs sound data received from smart phone 110 to digital signal that has been enhanced by the hearing loss compensation algorithm. The enhancements to the digital MEMs sound data may include compression, amplification, frequency, speed, noise reduction, speech separation and changing the sensitivity.

After processing and enhancing the digital MEMs sound data with one or more hearing loss compensation algorithms, a Digital to Analog Converter (DAC) 312 converts the enhanced digital MEMs sound data into an analog signal. For example, the enhanced digital MEMs sound data is converted back to an analog signal by the DAC 312 to be output as audio by output module 314.

Audio output module 314 may be a speaker, wired or wireless headphones or earphones (Bluetooth or infrared) connected to smart phone 140. For example, audio may be output via a speaker integrated with smart phone, generic headphones or earphones or hearing aid with Bluetooth streaming capabilities. When the audio output module 314 is a wireless device, the antenna 306 transmits the enhanced digital MEMs sound data converted to an analog signal by short range radio frequency such as Bluetooth. A separate specialized hearing aid device is not necessary but can be used if the user requires a hearing aid device. Audio output module 314 need not possess all of the circuitry and processing of a conventional hearing aid. The processing and enhancement of a live digital mems signal is performed by smart phone 140 and the audio is output via conventional speakers, headphones or Bluetooth capable hearing aids.

Smart phones 140, 145 and 150 receive digital MEMs sound data from smart phone 110. Smart phones 140, 145 and 150 process the digital MEMs sound data using speech to text algorithm 310. Exemplary speech to text algorithms includes automatic speech recognition algorithms, Hidden Markov Model (HMM) algorithms, Recurrent Neural Network (RNN) algorithms, Connectionist Temporal Classification (CTC), artificial neural network and various other machine learning algorithms and combinations of thereof.

In one example, a CTC algorithm uses a probabilistic approach to align the labels (transcripts) with the training data (audio). Another exemplary speech to text algorithm is an RNN algorithm that uses previous output as input for sequential data like speech.

Speech to text algorithms can be tailored to individuals based on type of hearing loss such as sensorineural hearing loss, conductive hearing loss and mixed hearing loss. In one example, a HI user of smart phone 140 may choose the preferred speech to text algorithm to apply to the digital MEMs sound data.

The preferred speech to text algorithm may be based on the HI user's previous experiences and/or visual preferences. The generated text from speech to text algorithm is output by visual output module 316. In examples the generated text is output on visual output module 316 as the corresponding audio is output via audio output module 314. The speech to text algorithm and hearing loss compensation algorithm work to synchronize the generated text with the corresponding audio output.

Visual output module 316 may be a screen, touch screen and/or display connected to smart phone 140. For example, text may be output via a screen integrated with smart phone or screen connected to smart phone 140 (wired or wireless).

Figure 4:
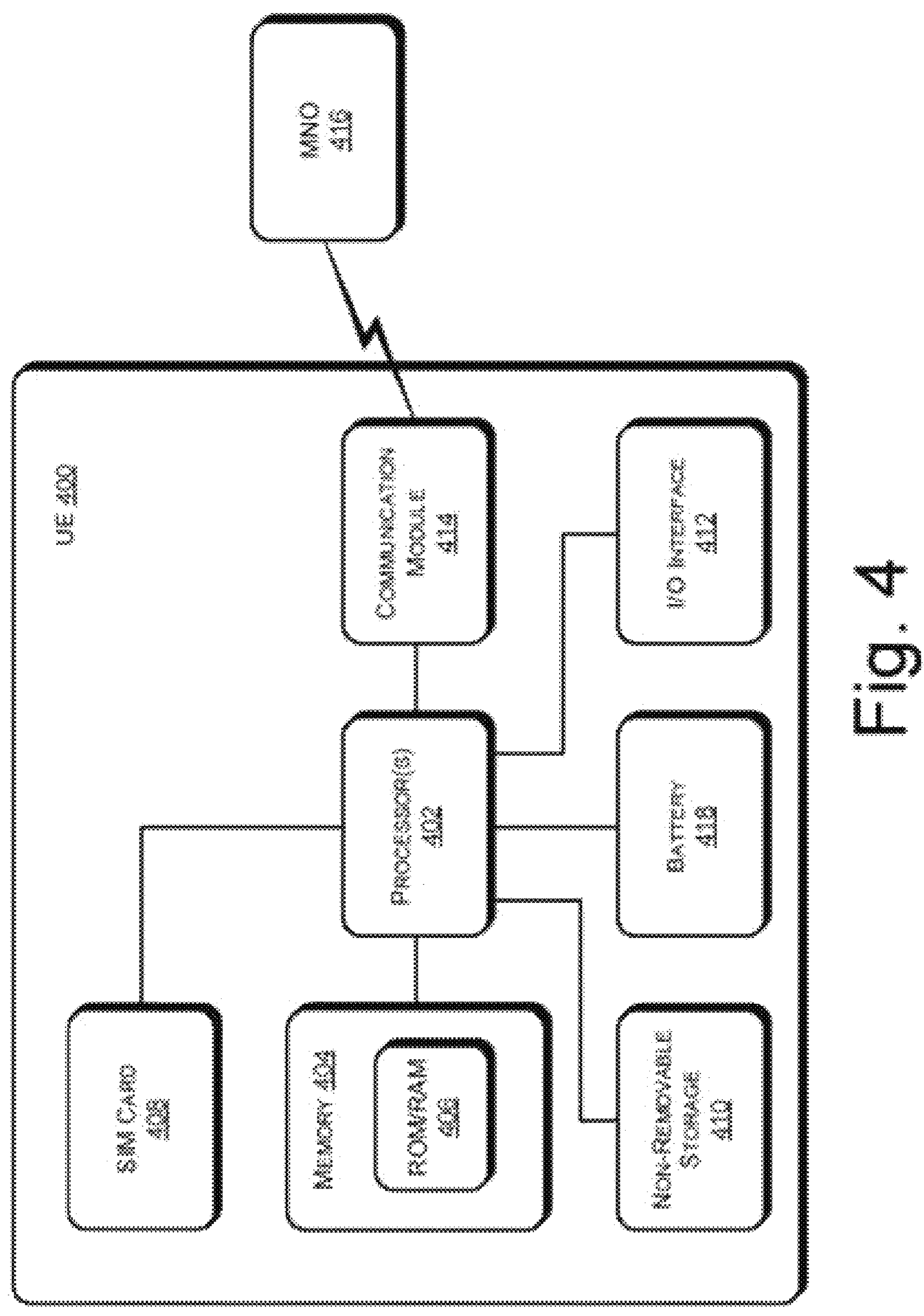
FIG. 4 illustrates an exemplary smart phone in accordance with the disclosed embodiments.

FIG. 4 illustrates an example block diagram of a smart phone 400, such as smart phones 110, 140, 145 and 150. The smart phone 400 may include one or more processors 402 and memory 404 coupled to the one or more processors 402. In some examples, the one or more processors 402 may be a central processing unit (CPU), a graphics processing unit (GPU), or both CPU and GPU, or other processing unit or component known in the art. Memory 404 may include volatile memory (such as random-access memory (RAM)) and/or non-volatile memory (such as read-only memory (ROM), flash memory, etc.) 406. The smart phone 400 may include a SIM card 408 coupled to the one or more processors 402, and non-removable storage 410 including, but not limited to, flash memory, magnetic storage, optical storage, and/or tape storage that may provide non-volatile storage of computer readable instructions, data structures, program modules, and other data for the smart phone 400.

The smart phone 400 may include an Input/Output (I/O) interface 412 coupled to the one or more processors 402 and may include a touch screen, microphone, and the like, configured to receive information from a user, and may include an audio output to headphones, earbuds and/or hearing aids. The display is configured to provide an output for the user. The smart phone 400 may include a communication module 414 coupled to the one or more processors 402 and configured to wirelessly communicate with a Mobile Network Operator (MNO) 416. The smart phone 400 may also include a battery 418 configured to power all components of the smart phone 400.

Memory 404, a non-transitory computer storage medium, may store computer-readable instructions executable by the one or more processors 402, that when executed by the one or more processors 402, cause the one or more processors 402 to perform operations described above with referenced to FIGS. 5 and 6. Some or all operations of the methods described above can be performed by execution of computer-readable instructions stored on a computer-readable storage medium.

Figure 5:
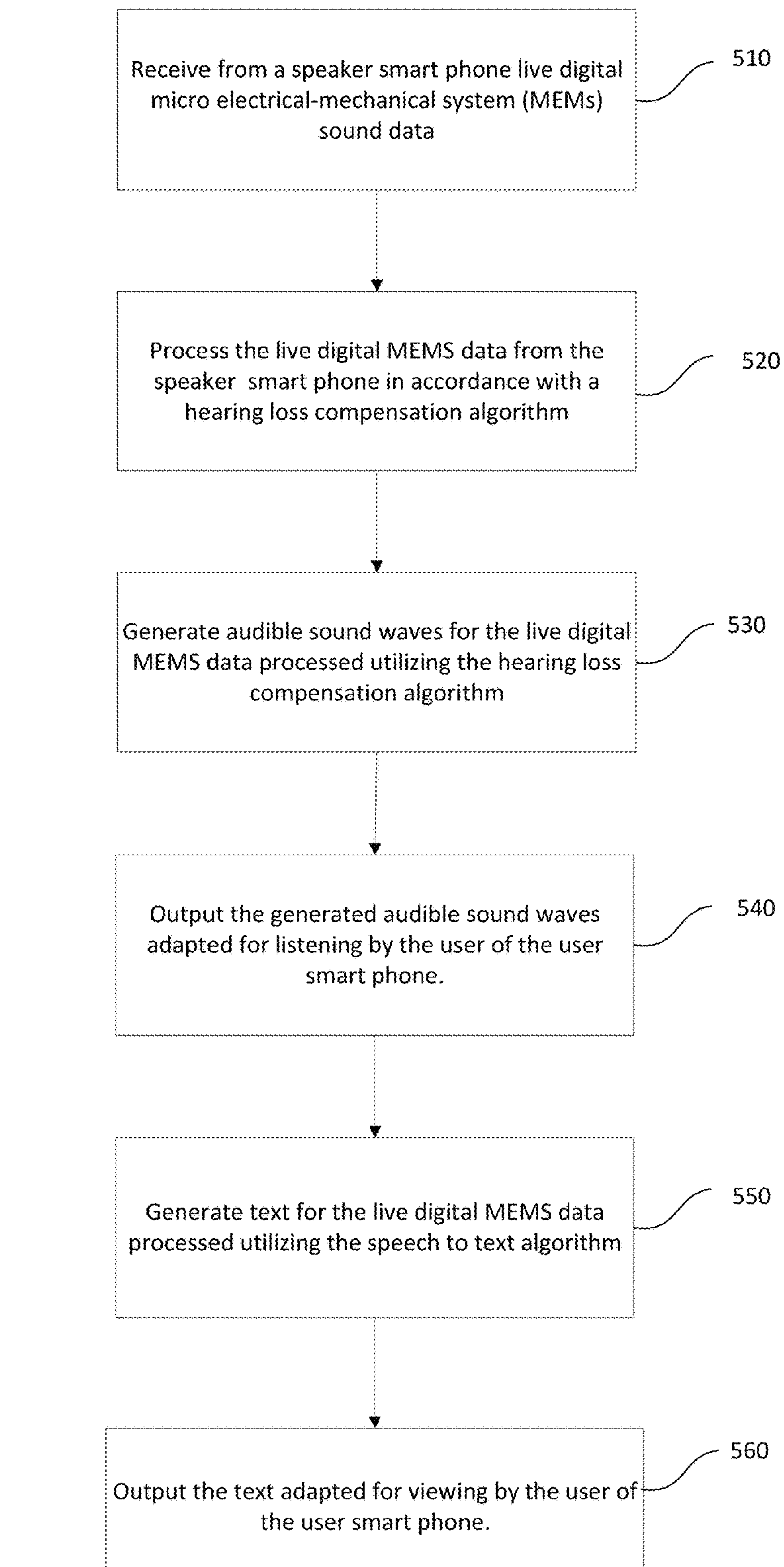
FIG. 5 depicts a flowchart illustrating an exemplary method for outputting audible soundwaves on a user smart phone, in accordance with the disclosed embodiments.

FIG. 5 illustrates an exemplary process flow for processing and generating audible sound waves for the live digital sound data processed utilizing the hearing loss compensation algorithm. The operations of FIG. 5 will be described as being performed by a smart phone 140 for purposes of explanation. In other implementations, the operations may be performed by or under the control of a processor external to smart phone 140. Generally, the process flow may be implemented using a user smart phone that is configured to communicate with a speaker smart phone 110.

The process flow beings at operation 510 of receiving live MEMS sound data from a speaker smart phone. Smart phone 110 captures sound in real-time using its microphone and transmits or live streams the sound via network 130 to smart phone 140 which receives the live digital MEMS sound data.

At operation 520, smart phone 140 processes the live digital MEMS sound data from the speaker smart phone 110 using a hearing loss compensation algorithm. Exemplary hearing loss compensation include sound core processing algorithms, compression algorithms, amplification algorithms, machine learning algorithms, speech separation or noise reduction algorithms, talker dependent analysis and combinations of thereof. Processing the live digital MEMS sound data may improve the sound quality, decrease noise interference and change the frequency such that a HI user can better hear and comprehend the live digital MEMS sound data.

At operation 530, audible sound waves are generated for the live digital MEMS file processed utilizing the hearing loss compensation algorithm. A digital to analog converter (DAC) converts the processed digital MEMs sound data to analog sound waves. An exemplary DAC implemented as integrated may be a metal-oxide semiconductor (MOS) mixed-signal integrated circuit chips of smart phone 140.

At operation 540, the audible sound waves generated by the DAC are output by smart phone 140 to a listening device. The audible sound waves are adapted for listening by a user of a user device. A listening device may be headphones, earbuds or hearing aids connected to smart phone 140. Smart phones 140 may be connected to the audible listening device by a wireless connection such as Bluetooth.

At operation 550, a speech to text algorithm processes the live digital MEMS sound data processed. Exemplary speech to text algorithms include automatic speech recognition algorithms, Hidden Markov Model (HMM) algorithms, Recurrent Neural Network (RNN) algorithms, Connectionist Temporal Classification (CTC), artificial neural network and various other machine learning algorithms and combinations of thereof.

At operation 560, the generated text is output adapted for viewing by the user of the user smart phone. The generated text may be output via a screen, touch screen and/or display connected to smart phone 140. For example, text may be output via a screen integrated with smart phone or screen connected to smart phone 140 (wired or wireless).

Figure 6:
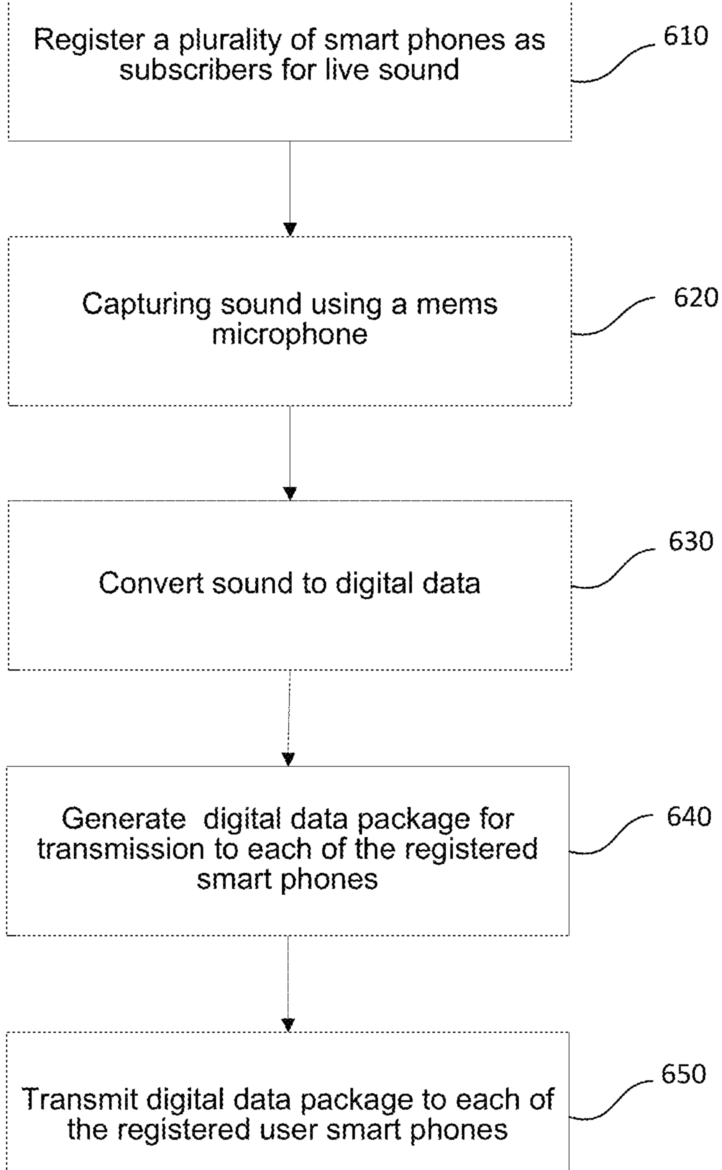
FIG. 6 depicts a flowchart illustrating an exemplary method for generating encoded digital sound wave data for transmission to each of the registered smart phones in accordance with disclosed embodiments.

FIG. 6 illustrates an exemplary process flow for generating and transmitting encoded digital sound data to a plurality of subscribed user smart phones. The operations of FIG. 6 will be described as being performed by a speaker smart phone 110 for purposes of explanation. In other implementations, the operations may be performed by or under the control of a processor external to speaker smart phone 110. Generally, the process flow may be implemented using a speaker smart phone that is configured to communicate with a plurality of subscribed user smart phones.

At operation 610, a plurality of user smart phones subscribes for live sound from a speaker smart phone. An application and/or offer to subscribe may be broadcast by speaker smart phone to user smart phones within auditorium or classroom setting. For example, the speaker smart phone may broadcast a subscription application to user smart phones within 100 feet of a speaker smart phone. In one example, speaker smart phone broadcasts the application and/or offer to subscribe via a Wi-Fi network. For example, the application and/or offer to subscribe is broadcast and/or sent to all smart phones that have joined the Wi-Fi network and/or are within a certain distance of the speaker smart phone. User smart phones may subscribe by affirming subscription and/or downloading an application to receive live sound from the speaker smart phone.

At operation 620, a digital electrical-mechanical system (MEMs) microphone of the speaker smart phone captures live sound. An exemplary MEMS microphone that is etched into a silicon wafer or chip using MEMS technology of the speaker smart phone.

At operation 630, the captured live sound is converted to digital sound data. The live sound from a MEMs microphone may be processed within the same chip as the MEMs microphone by an ADC converter.

At operation 640, upon converting the live sound to digital sound data, the digital sound data is encoded for transmission to each of the subscribed user smart phones. For example, if a smart phone is subscribed to receive live sound from the speaker smart phone, the digital sound data is encoded and packaged for transmission to subscribed user smart phones. In one example, subscribing to receive live sound data from a speaker may cause the subscribed user smart phones to make a representational state transfer (REST) application programming interface (API) call to the speaker smart phone. The payload of the REST API call includes metadata identifying the user phone and the live sound being requested. Using the request headers from the REST API call, the speaker smart phone generates and formats the digital sound data. At operation 650, transmits the generated and formatted digital sound data to the plurality of subscribed user smart phones.

The operations of FIGS. 5 and 6 need not necessarily be performed one after another in immediate sequence. While the above descriptions illustrate various aspects of the present disclosure, such as a plurality of user smart phones receiving live sound data from a speaker smart phone, the present disclosure is not so limited. The methods, operations, etc. described above may be performed in an iterative matter such that additional user smart phones may subscribe to receive live sound data from a speaker smart phone. These additional iterations may also be reverted in a manner similar to that described above.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The invention claimed is:

1. A method comprising:

using a user smart phone having at least one processor for:

receiving, from a speaker smart phone live, digital micro electrical-mechanical system (MEMs) sound data captured by the speaker smart phone and transmitted to the user smart phone via at least a wireless network;

processing the live digital MEMS sound data from the speaker smart phone in accordance with a hearing loss compensation algorithm;

generating audible sound waves for the live digital MEMs sound data processed utilizing the hearing loss compensation algorithm; and outputting the generated audible sound waves adapted for listening by a user of the user smart phone.

2. The method of claim 1, wherein the live digital MEMs sound data is live streamed from the speaker smart phone to the user smart phone.

3. The method of claim 1, wherein the live digital MEMs sound data is live streamed via wi-fi from the speaker smart phone to the user smart phone.

4. The method of claim 1, wherein a speech to text algorithm generates text for the live digital MEMS sound data.

5. The method of claim 4, further comprising:

outputting the generated text for viewing by a user of the user smart phone.

6. The method of claim 1, wherein the user smart phone has subscribed to receive live digital MEMs sound data from the speaker smart phone.

7. The method of claim 1, wherein the speaker smart phone is a smart phone positioned near a live speaker.

8. A non-transitory computer-readable medium storing instructions that when executed by a processor cause the processor to perform operations comprising:

receiving, from a speaker smart phone, live digital micro electrical-mechanical system (MEMs) sound data captured by the speaker smart phone and transmitted at least over a wireless network;

processing the live digital MEMs sound data from the speaker smart phone in accordance with a hearing loss compensation algorithm;

generating audible sound waves for the live digital MEMs sound data processed utilizing the hearing loss compensation algorithm; and outputting, at a user smart phone, the generated audible sound waves adapted for listening by the user of the user smart phone.

9. The non-transitory computer-readable medium of claim 8, wherein the live digital MEMs sound data is live streamed from the speaker smart phone to the user smart phone.

10. The non-transitory computer-readable medium of claim 9, wherein the live digital MEMs sound data is live streamed via wi-fi from the speaker smart phone to the user smart phone.

11. The non-transitory computer-readable medium of claim 10, wherein a speech to text algorithm generates text for the live digital MEMS sound data.

12. The non-transitory computer-readable medium of claim 11, further comprising:

outputting the generated text for viewing by a user of the user smart phone.

13. The non-transitory computer-readable medium of claim 9, wherein the user smart phone is one of a plurality of user smart phones having subscribed to live digital MEMs sound data from the speaker smart phone.

14. The non-transitory computer readable medium of claim 8, wherein the user smart phone has subscribed to receive live digital MEMs sound data from the speaker smart phone.

15. A method comprising:

using a user smart phone having at least one processor for:

receiving, by a user smart phone over a wireless cellular network, live digital micro electrical-mechanical system (MEMs) sound data captured by a speaker smart phone;

processing the live digital MEMS sound data from the speaker smart phone in accordance with a hearing loss compensation algorithm;

generating audible sound waves for the live digital MEMs sound data processed utilizing the hearing loss compensation algorithm; and outputting the generated audible sound waves to a listening device connected to the user smart phone.

16. The method of claim 15, wherein generating the audible sound waves comprises converting the processed live digital MEMs sound data to analog sound waves.

17. The method of claim 15, wherein the generated audible sound waves are outputted to the listening device using a short range radio frequency.

18. The method of claim 17, wherein the short range radio frequency comprises a Bluetooth connection.

19. The method of claim 15, further comprising generating text by processing the live digital MEMS sound data using a speech to text algorithm and outputting the text adapted for viewing by a user of the user smart phone.

20. The method of claim 19, wherein the speech to text algorithm comprises a connectionist temporal classification (CTC) algorithm.

* * * * *